United States Patent
O'Sullivan

[11] Patent Number: 5,861,204
[45] Date of Patent: Jan. 19, 1999

[54] ROLL PROTECTION SHIELD AND METHOD AND APPARATUS FOR FORMING SAME

[76] Inventor: Brian Jonathan O'Sullivan, 17679 Kennedy Road, R.R. #2, Lot 12, Concession 2, Caledon, Ontario, Canada, L0N 1C0

[21] Appl. No.: 650,574

[22] Filed: May 20, 1996

[51] Int. Cl.⁶ .............................. B65D 85/66; B32B 3/24
[52] U.S. Cl. .......................... 428/131; 428/134; 428/136; 428/119; 428/906; 410/47; 410/48; 410/41; 206/397; 206/415; 206/416; 206/414; 206/413
[58] Field of Search ..................... 428/134, 131, 428/136, 119, 906; 410/47, 48, 41; 206/397, 415, 416, 414, 413

[56] References Cited

U.S. PATENT DOCUMENTS

| | | | |
|---|---|---|---|
| 2,801,784 | 8/1957 | Blatt | 206/397 |
| 3,329,259 | 7/1967 | Mayer | 206/397 |
| 4,204,479 | 5/1980 | Rosa | 206/397 |
| 5,236,087 | 8/1993 | Morgan | 206/397 |
| 5,238,113 | 8/1993 | Parrott et al. | 206/395 |
| 5,515,977 | 5/1996 | Lambert | 206/597 |

Primary Examiner—William P. Watkins, III
Attorney, Agent, or Firm—Brian J. O'Sullivan

[57] ABSTRACT

The present invention provides a molded shield for use as a protector for a roll. The shield comprises a first section for insertion into an end of the roll, the first section having a degree of curvature approximating that of an inside surface of the roll; and a second section integral with the first section and substantially perpendicular thereto, the second section to abut the end of the roll into which the first section is inserted. A method and an apparatus for forming a roll protector shield is also provided. Preferable, the shield is formed from ultra-high molecular weight polyethylene.

1 Claim, 7 Drawing Sheets

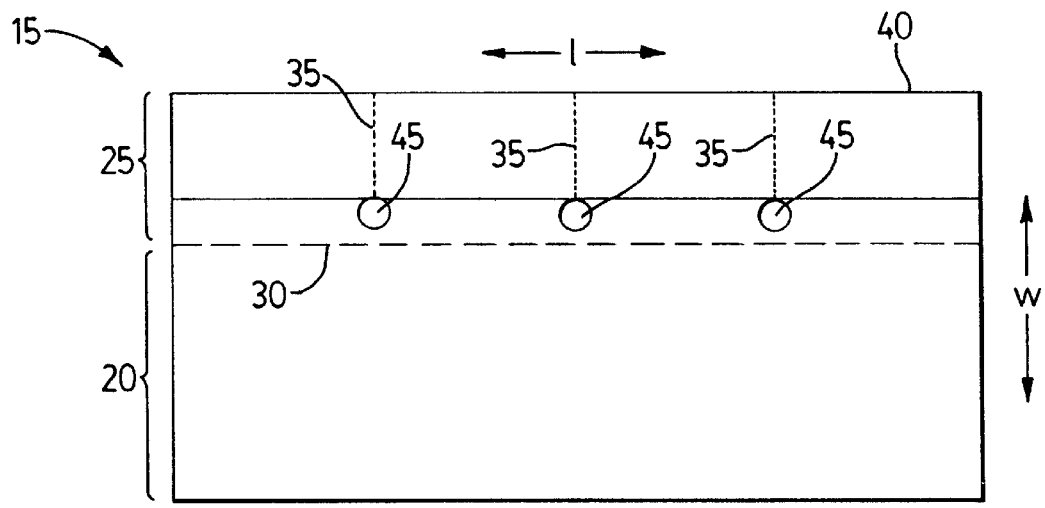
FIG. 1
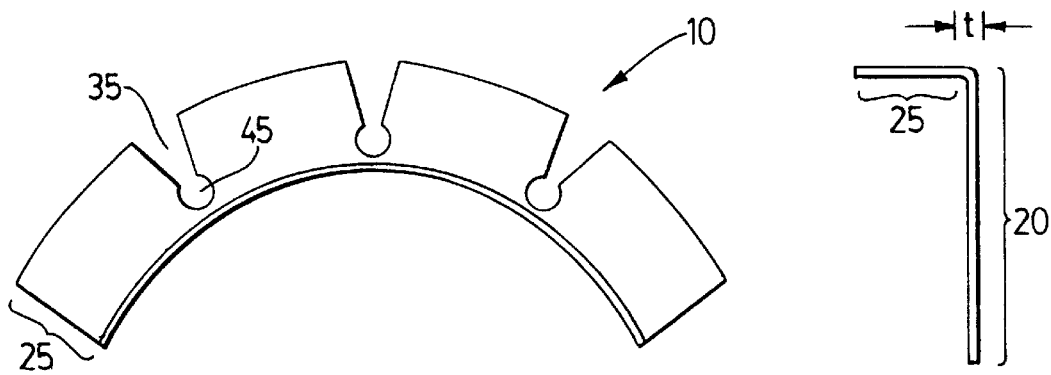
FIG. 2
FIG. 3
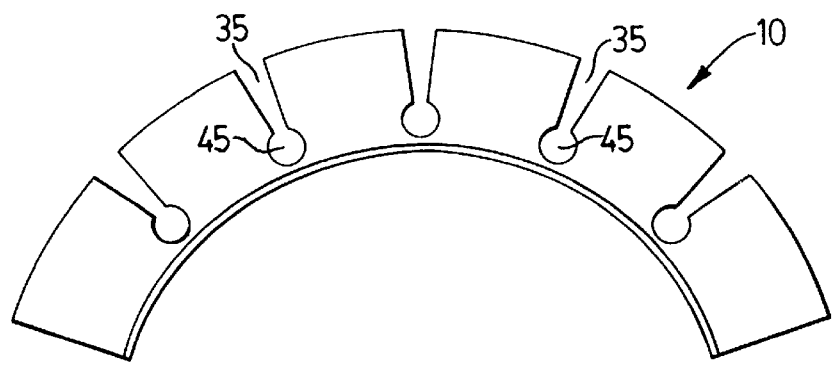
FIG. 5

ROLL PROTECTION SHIELD AND METHOD AND APPARATUS FOR FORMING SAME

BACKGROUND OF THE INVENTION

1. Field of the Invention

The present invention generally relates to the field of protection of rolled sheet materials. In particular, the present invention relates to a shielding device for the protection of the ends of such rolls during transportation and a method and apparatus for forming same.

2. Description of the Prior Art

Large heavy rolls of sheet material are often transported on vehicles from one place to another. These rolls are often bound with strapping through the core about the ends and over the exterior surface to retain their integrity during handling. When the rolls are loaded for transport, it is common to lay them on their exterior surface. The curvature of the exterior surface facilitates movement of the rolls on the loading deck. Further, when the rolls are lying on their exterior surface, loading cranes can insert a hook or bar into the hollow core to pick up the rolls. Once the rolls are located on the deck of a vehicle, stops are wedged under the exterior surface to prevent them from rolling. Finally the rolls may be fastened down with chains, or the like, that pass through the core and are secured to the deck at each end of the roll. The number of chains used to fasten the roll in place will depend upon the weight of the roll but it is common to have three or more chains that are secured forward, rearward and in line with the axis of the roll.

During transportation on a vehicle, rolls may be shaken and jostled. The securing chains resist movement by pulling in an opposite direction against the interior surface of the core particularly about the edges. Over a long journey frictional abrasion between the rolls and the chains can cause gouging, bending and deformation due to chain tension and other damage that affects one or more layers of the rolled material from the interior surface outwards. In severe cases, there may also be telescoping of the roll where adjacent layers of the rolled material slide against one another in the direction of the axis of the roll. Telescoping can expose greater areas to damage from the chains, expose more material to the elements and create handling problems. Consequently, when the roll is finally unrolled and put into use, there is often a portion of the sheet metal along the edges which is unusable due to damage from the chains. Further to this end, as both edges typically suffer damage during transportation, the usable width of the roll is decreased from both edges and requires the additional labour of trimming the damaged edges. This situation often results in unnecessary waste of material and typically drives the price of products fabricated from such rolled material up due to the waste factor. When the rolled material is of poorer quality such as mild carbon steel, or the thickness of the rolled stock is such that it resists damage, the consequences of the edge damage are not as severe. However, when the rolled stock comprises significantly more expensive material such as stainless steel or aluminum or is relatively thin such as gauge sheet material, the costs associated with such damage can be significant.

In the prior art a number of attempts have been made to reduce the damage to rolls from chains. One prior art device is a large metal ring or pipe section which is fitted into the core about the edges. The chains are then led through the rings and are thus separated from the edges and held above the interior surface to protect same from chain abrasion. These large metal rings suffer the disadvantage that they must be manufactured to the correct size to fit into the core of a roll. However, core diameters may be different for different sheet materials, different material thicknesses etc., and, even if these parameters are constant, there may be a wide tolerance in the core diameter from roll to roll as a result of the rolling process. Consequently, a manufacturer of such rings must make many sizes, thereby increasing costs and inventory. The rings are cumbersome to use and store and the fit may be imperfect in spite of the manufacturer's efforts. Furthermore, steel rings are heavy for trackers to install and can cause back injuries, are prone to corrosion and are difficult to store.

The problem of the rings has been addressed by partial shields which encircle only part of the circumference of the edges of the core. All such partial shields known to the inventor are manufactured from metal in order to withstand the severe stresses and high bearing forces of the chains required to secure large rolls. These metal partial shields are relatively rigid and therefore do not readily conform to the size of the interior surface of the core. Being metal of sufficient thickness to withstand the chain abrasion, such shields are also capable of cutting or injuring an operator if dropped or mishandled.

When loaded, the protector elastically deforms to conform to the shape of the core and interior edge. In contrast to using conventional metal protectors, the steel roll itself will deform under the loading forces as the protectors are typically formed of plate steel which is thicker and thereby less elastic than the sheet forming the steel roll.

SUMMARY OF THE INVENTION

It is an object of the present invention to obviate and mitigate at least one of the disadvantages of the prior art. Accordingly, in one aspect the present invention provides a molded shield for use as a protector for a roll, comprising:

(i) a first section for insertion into an end of the roll, the first section having a degree of curvature approximating that of an inside surface of the roll; and (ii) a second section integral with the first section and substantially perpendicular thereto, the second section to abut the end of the roll into which the first section is inserted.

In another aspect the present invention provides a process for forming a molded shield for use as a protector for a roll, comprises the steps of:

(i) heating a sheet to a temperature sufficient to soften the sheet;

(ii) transferring the hot sheet to a molding apparatus before the sheet cools significantly;

(iii) subjecting the sheet to containment pressure within a closed mold for a period of time sufficient to allow surfaces of the sheet to cool to about room temperature; and (iv) removing the now formed shield from the mold and immersing in a cooling tank until the entire shield is at or below room temperature.

In another aspect the present invention provides an apparatus for molding a shield for use as a protector for a roll from a sheet, the apparatus comprising:

(i) a mold having a male section and a female section moveable with respect to one another between an open position for receiving a first section of a sheet to be molded and a closed position for molding the sheet; and (ii) a folder plate mounted on the male section, the folder plate moveable between a retracted position, and an extended position wherein the folder plate engages and folds a second section of the sheet to a position substantially perpendicular to the first section of the sheet.

In general terms, the product of the present invention provides an improved partial shield for large heavy rolls of sheet material to protect same from abrasion and damage from securing chains or the like. A partial shield in accordance with one embodiment of the present invention is fabricated of plastic, which will provide adequate protection while being economical, flexible, lightweight, adaptable, safe and convenient to use.

BRIEF DESCRIPTION OF THE DRAWINGS

Embodiments of the present invention will be described, by way of example only, with reference to the accompanying drawings, in which:

FIG. 1 is a top view of a pre-molded sheet of plastic having the locations of cuts and folds marked upon it;

FIG. 2 is a front view of the plastic shield after it is cut and molded;

FIG. 3 is a cross-sectional side view of the plastic shield of FIG. 2;

FIG. 5 is a perspective view of an apparatus for molding the plastic shield;

DETAILED DESCRIPTION OF THE PREFERRED EMBODIMENTS

Figure 4:
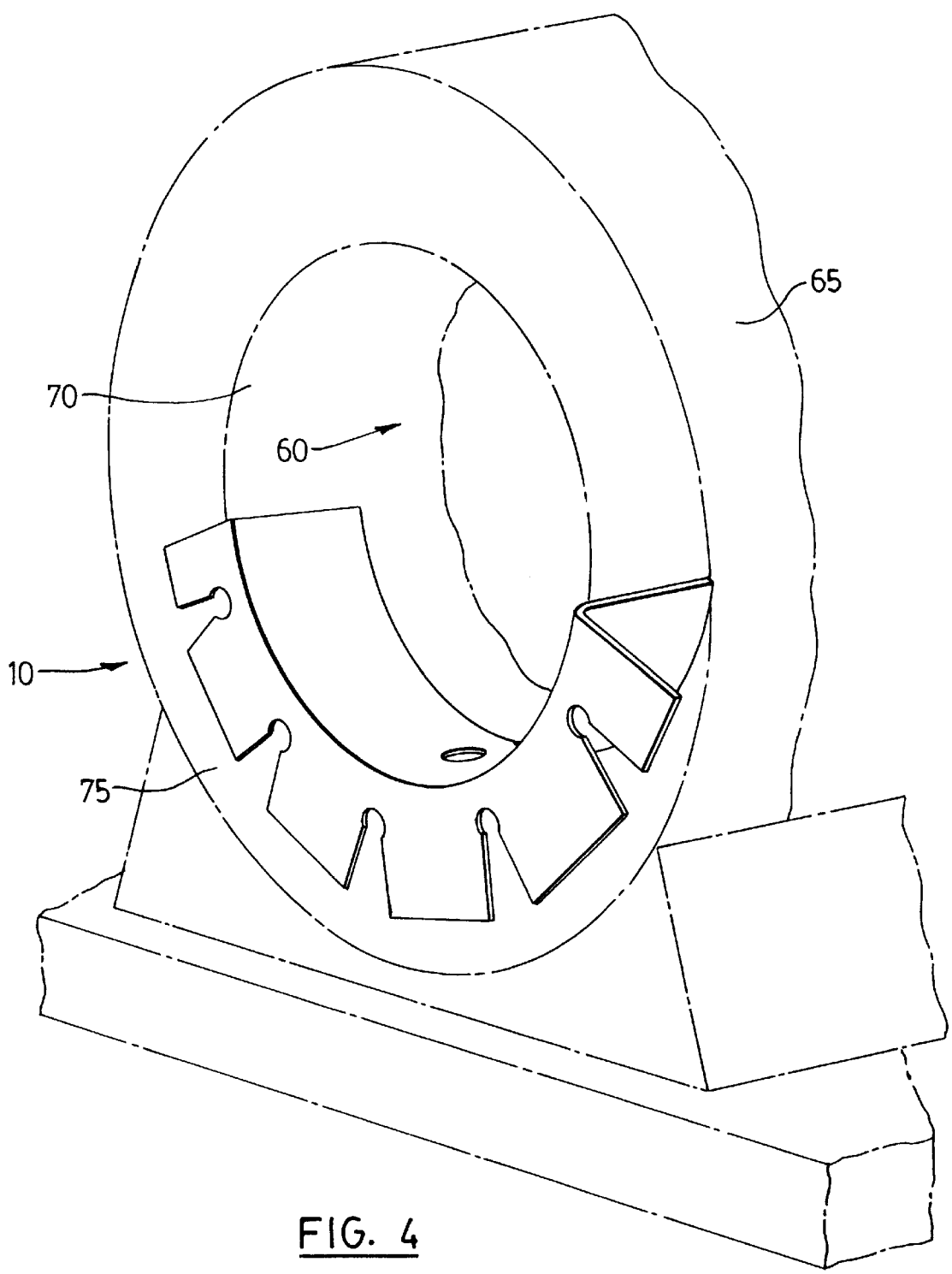
FIG. 4 is a perspective view of the plastic shield in situ at one end of a roll (shown in dashed lines)

In the Figures which illustrate the preferred embodiments of this invention, like numerals represent like elements.

A roll protection shield 10 in accordance with one embodiment of the present invention is shown generally in FIGS. 1 through 4. Shield 10 is fabricated from a substantially rectangular sheet 15 of ultra-high molecular weight, high density polyethylene (UHMW) having a width (w), a length (l) and a thickness (t). FIG. 1 shows sheet 15 prior to molding.

Sheet 15 comprises a first section 20 and a second section 25 which are nominally divided by a folding line 30. Generally, first section 20 has a width ⅔ w and second section 25 has a width ⅓ w.

A plurality of cut lines 35 extend perpendicularly from an edge 40 across second section 25, each cut line 35 terminating in an aperture 45 proximal folding line 30. Cut lines 35 and apertures 45 aid in the reduction of stress concentration during molding of shield 10.

When sheet 15 is molded in accordance with the process which will be described below, shield 10 is formed. In shield 10, second section 25 is substantially perpendicular to first section 20, the two sections having been folded along nominal folding line 30 (FIG. 3). As shown in FIG. 2, sheet 15 has also been molded such that the originally flat sheet is now curved. Molding into this curved configuration results in the spreading of cut lines 35 and apertures 45 and the fanning out of second section 25.

The degree of curvature of shield 10 is not particularly limited and will depend on the diameter of the core of the roll into the end of which shield 10 is to be placed. FIG. 4 shows shield 10 in position placed in one end of a roll. It is believed that the relationship between the degree of curvature of shield 10 and the diameter of the core of the roll will be apparent to a person skilled in the art.

The shield is preferably fabricated from ultra-high molecular weight, high density polyethylene (UHMW), such as Ramex®. However, other suitable materials, such as nylon, polyvinylchloride, polyesters, acrylics and ABS may also be suitable depending on the application and the climatic conditions. It is believed that the selection of a suitable material is within the purview of a person skilled in the art.

The thickness (t) of the material is not particularly limited and will depend upon, for example, the size of the rolls, the forces to be expected from the securing chains and the chemical and physical properties of the material from which it is formed. It is believed that the selection of a suitable material is within the purview of a person skilled in the art. Preferably, the thickness of the material will be between about 1/16 inch and 1 inch.

Preferably, the length of the shield is equal to about ⅓ of the circumference of the core of the roll so as to evenly distribute any load applied to the shield over a substantial portion of the core and edge of the roll.

Conventional wisdom dictates that ultra-high molecular weight (UHMW) polyethylene, such as Ramex®, are not heat formable. However, use of the method and apparatus described below has proved to provide a durable, high quality product.

As shown in FIG. 4, first section 20 of shield 10 is inserted into core 60 of a roll 65, to lie on the interior surface 70 of a bottom portion of core 60 such that second section 25 of shield 10 abuts an end 75 of roll 65. Because the shield is flexible it will readily conform to the curvature of the core. Both ends of a roll are thus protected. Securing lines (not shown) brought through the core to secure the roll to the deck of a vehicle are laid onto the shields and then secured to the deck. Thereafter, during any transportation or movement of roll 65, plastic shield 10 receives and distributes compression forces of the securing lines and aids in the protection of roll 65 from abrasion and damage. As stated above, shield 10 also aids in the prevention of telescoping of the rolled material.

The process of producing the shield in accordance with the present invention will now be described, by way of example only, with reference to the production of a shield from a sheet of UHMW polyethylene (Ramex®) having dimensions of approximately 3/16×24×12 inch. However, as will be understood by a person skilled in the art, the size of the sheet may vary according to the desired size and strength of the protector.

In general the process comprises the steps of:

(iii) heating the Ramex® sheet at a temperature of 330±20° F. for 530±30 seconds;

(iv) transferring the hot sheet to a molding apparatus before the sheet cools significantly (e.g., within approx. 10–20 seconds);

(v) subjecting the sheet to containment pressure within the closed mold for a period of time (approx. 3 minutes) while allowing the surfaces of the sheet to cool to about room temperature (45°–60° F.); and (vi) removing the now formed shield from the mold and immersing in a cooling tank until the entire shield is at or below room temperature.

The heating step (i) may be carried out in any suitable oven. In the preferred embodiment, the heating is performed in a gas-fired conveyor oven, the operation of which is conventional.

As will be discussed in detail below, the actual molding of the shield (step (iii)) is performed in a two step procedure. The time for which the sheet is subjected to containment pressure within the closed mold is dependant on the thickness of the sheet and the rate of cooling. Typically, the surface of a 3/16" thick sheet will cool to room temperature in about 3 minutes, while a ½" sheet will require about 8 minutes.

An apparatus 100 suitable for forming a shield in accordance with the present invention is shown in FIGS. 5 through 10. Apparatus 100 generally comprises a female mold section 110 mounted on a base 115. Female mold section 110 is hollow and is provided with an inlet and an outlet (only one shown as 112) which provide a passage way to allow a coolant to circulate through the hollow body. At least one surface, the molding surface, of female mold section 110 is concave.

Figure 7:
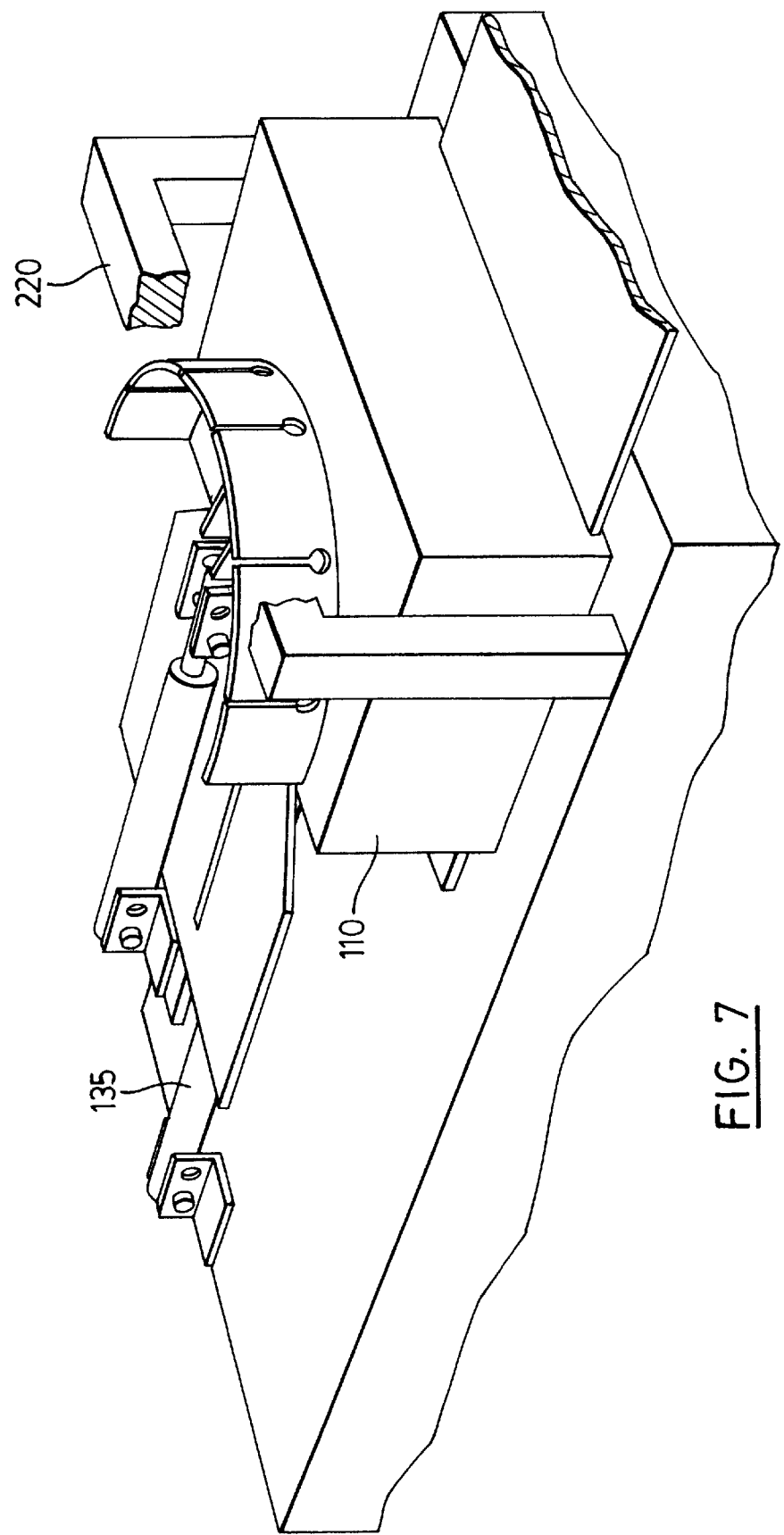
FIG. 7 is a perspective view of the apparatus of FIG. 5 after a first stage of molding.

Complementary male mold section 120 is slidably mounted on base 115 and is moveable between an open position (as shown in FIG. 5) and a closed (molding) position (as shown in FIG. 7). Movement of male mold section 120 is achieved by a drive means such as a hydraulic ram drive 135. This type of reciprocating drive mechanism is conventional and will not be described in any detail herein. As will be apparent to a person skilled in the art, other drive means may be employed. For example, mechanical leverage may be applied to the male section by means of a fulcrum arm or a screw-drive.

The extent of movement of the male mold section toward the female mold section is restricted by a limiting means. The limiting means may simply be the maximum extension of the ram or may, for example, be a solenoid control which arrests the ram such that the male mold stops at a specified distance from the female mold. The choice of a suitable limiting means is not particularly limited and is believed to be within the purview of a person skilled in the art. In the presently preferred embodiment, movement of the male mold section toward the female mold section is limited by contact of a locating pin onto the female mold. The locating pin will be described in more detail below.

Male mold section 120 comprises a hollow body 122 having a lower slider plate 124. A protruding end 126 of slider plate 124 is engaged within a channel 130 located toward the bottom of female mold section 110. The engagement of protruding end 126 within channel 130 helps ensure that male mold section 120 maintains axial alignment toward female mold section 110 in a regulated, even, reproducible manner. Male mold section 120 further comprises an inlet and an outlet (only one shown as 128) which provide a passage way to allow a coolant to pass through hollow body 122 and, preferably, a locating pin 132. The purpose of locating pin 132 will be discussed below when describing the operation of apparatus 100. At least one surface of male mold section 120, the molding surface, is convex and this convex surface is complementary to the at least one concave surface of female mold section 110. Preferably the molding surfaces of the male and female mold sections have a tolerance of about 0.005 inch.

A folding plate 160 is slidably mounted atop male mold section 120. Movement of folding plate 160 in relation to male mold 120 is restricted by means of a pair a pins 165 (only one shown) which protrude from the top surface of male mold 120 into guide channels 170 (only one shown). Guide channels 170 lie parallel to the direction of motion of male mold section 120 with respect to female mold section 110. A front end of folding plate 160 is generally triangular in shape. A wedge member 180 is provided toward the apex of the triangle, as shown in FIG. 5. The size, orientation and purpose of wedge member 180 will become apparent to a person skilled in the art when operation of apparatus 100 is discussed in detail below. Movement of folder plate 160 is achieved by means of a second hydraulic ram drive 185. As stated above, this type of reciprocating drive mechanism is conventional and will not be described in any detail herein.

As will be apparent to a person skilled in the art, a single two-stage drive means may be utilized to provide movement of both the male mold and the folding plate, or two independent drive means may be utilized.

Figure 6:
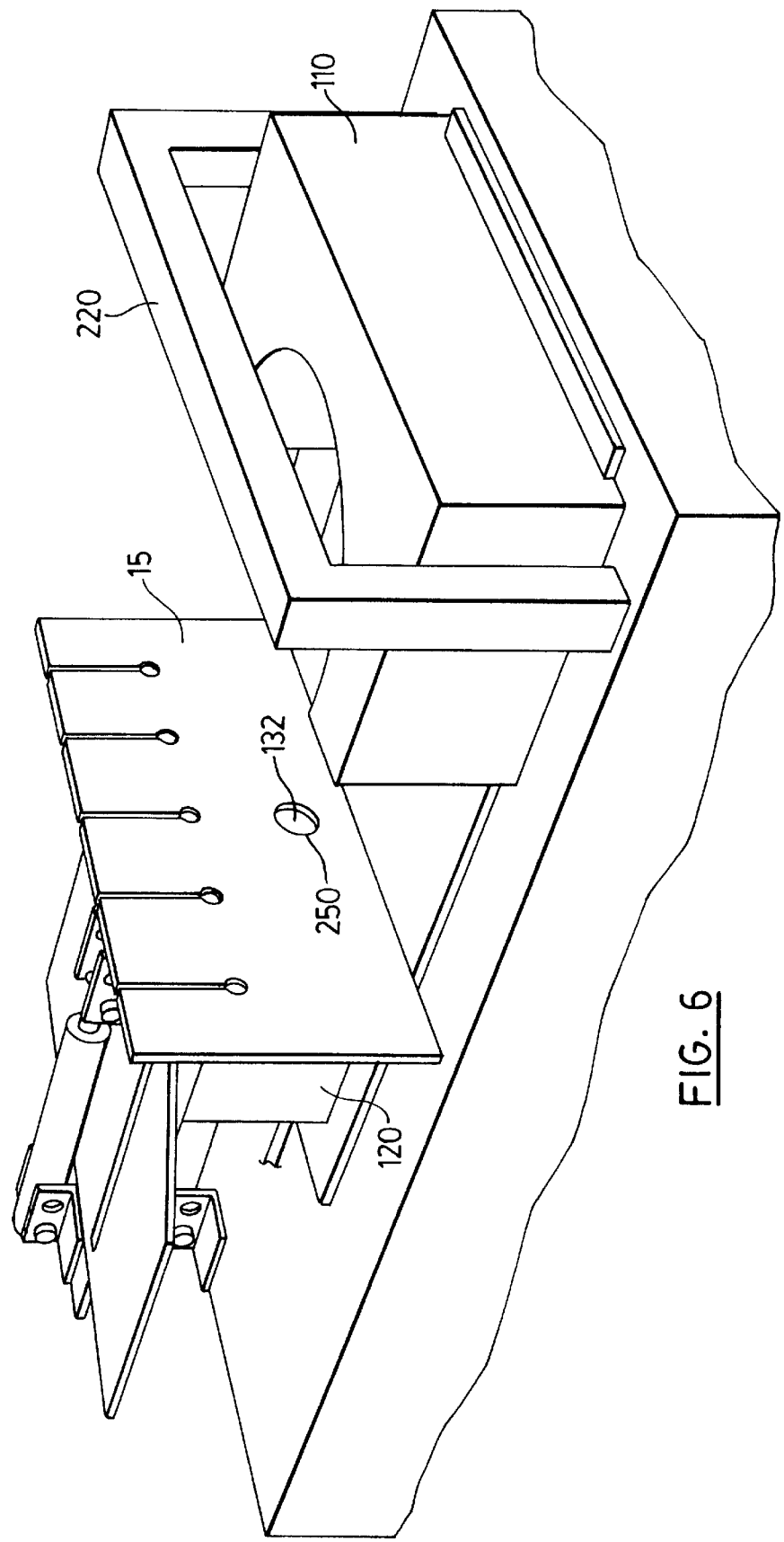
FIG. 6 is a perspective view of the apparatus of FIG. 5 having a pre-molded plastic sheet located therein.

In operation, a pre-heated (see below) sheet 15, which is to be molded, is placed substantially vertically between female mold section 110 and male mold section 120. First edge 40 of sheet 15 is placed at the top, as shown in FIG. 6. The longitudinal axis of sheet 15 should be substantially perpendicular to the direction of motion of male mold section 120 with respect to female mold section 110.

Optionally, locating pin 132 is engaged within an aperture 250 previously formed in sheet 15. Locating pin 132 aids in ensuring the correct alignment of sheet 15 with respect to female mold 110 and aids in the prevention of unwanted movement of sheet 110 during the molding process.

Once sheet 15 is in place, male mold section 120 is moved toward female mold section 110, thereby pressing first section 20 of sheet 15 onto the curved surface of female mold section (as shown in FIG. 7). Male mold section 120 is then maintained in a molding position whereby it exerts containment (i.e., molding) pressure on sheet 15.

As discussed above, movement of the male mold section toward the female mold section is stopped when locating pin 132 contacts the female mold section. The length of the locating pin is slightly less than the thickness of the sheet such that when the mold section is fully closed, the mold sections exert containment pressure on the sheet, but do not significantly compress the sheet.

As will be apparent to a person skilled in the art, if locating pin 132 is not the preferred limiting means, the locating pin should be of sufficient length to stabilize the sheet material, but insufficient length to prevent interfering with the molding process, i.e., shorter than the thickness of the sheet being pressed, unless the pin is, for example, spring loaded and becomes recessed into the male mold once pressure is applied.

Figure 8:
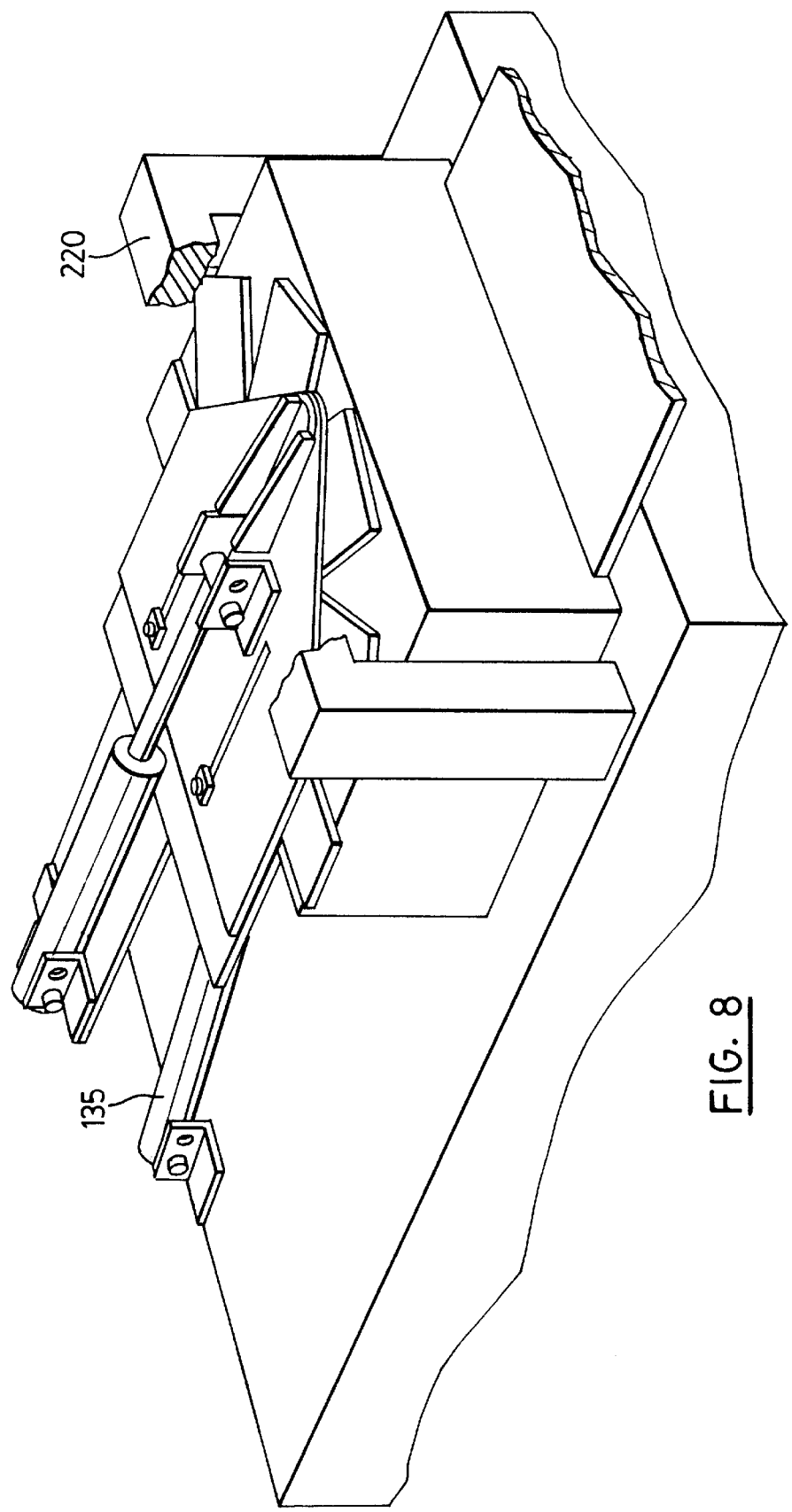
FIG. 8 is a perspective view of the apparatus of FIG. 5 after a second stage of molding.
Figure 9:
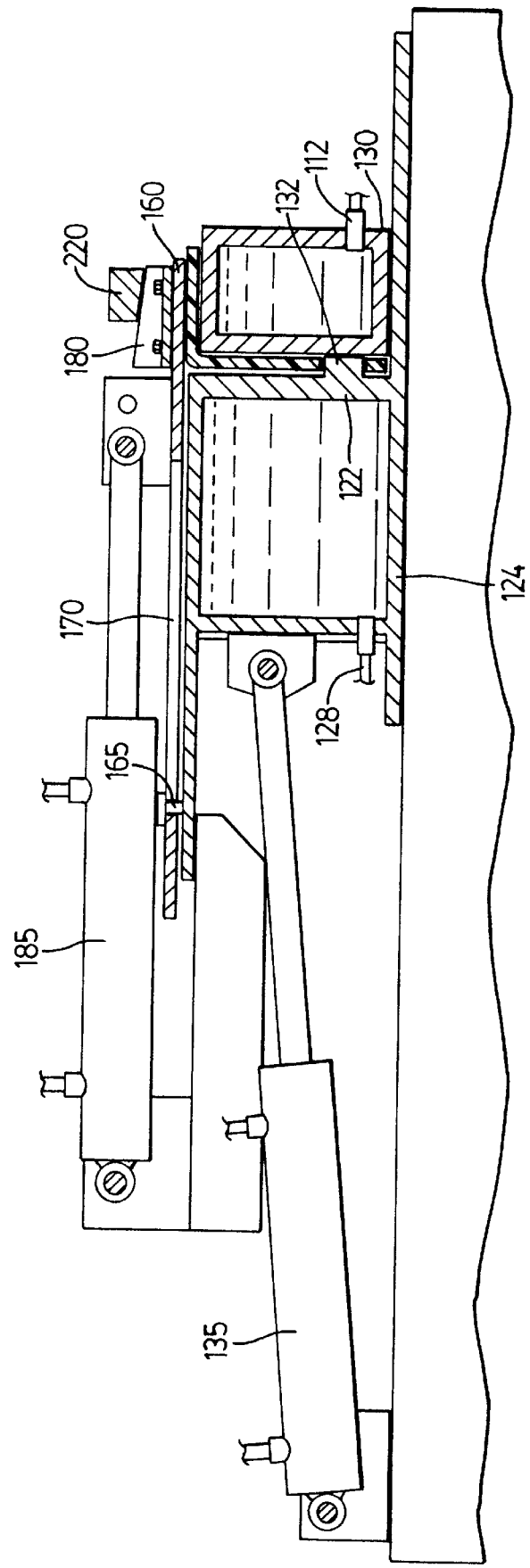
FIG. 9 is a side sectional view of the apparatus of FIG. 8.

Once male mold section 120 is in its molding position, folding plate 160 is slid such that second section 25 of sheet 15 is folded over female mold section 110 (along fold line 30 of sheet 15) to a position wherein second section 25 of sheet 15 is substantially perpendicular to first section 20 of sheet 15. As a result of this folding and the curved profile of first section 20 of sheet 15, cut lines 35 and apertures 45 of sheet 15 spread and second section 25 fans out (as shown in FIG. 8).

As folding plate 160 passes over female mold portion 110, tapered top surface of wedge member 180 engages a lower surface of a press bar 220. as folding plate continues to move in a substantially horizontal direction, the tapering of wedge member 180 forces folding plate downward toward female mold portion 110, thereby exerting a bending pressure on second section 20 of sheet 15. This bending pressure facilitates the molding process and aids in forming the substantially perpendicular fold between first section 20 and second section 25.

To remove the now molded shield, folding plate 160 is moved back to its starting position, as is male mold section 120. Shield 10 may then simply be lifted from the apparatus.

It is envisioned that the primary components of the apparatus will be formed from stainless steel, although other durable resilient materials would also suffice. The choice of such a material is believed to be within the purview of a person skilled in the art. Preferably, all surfaces which contact the sheet to be formed are chrome plated, as this provides a smooth surface which is less likely to adhere to the sheet during molding.

Figure 10:
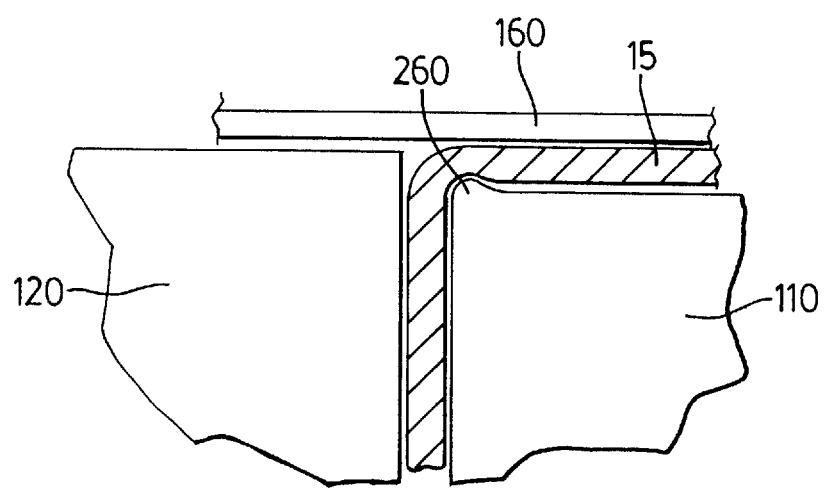
FIG. 10 is a schematic representation of a portion of a preferred embodiment of the apparatus of FIG. 5.

In a preferred embodiment of the apparatus, a portion of which is shown schematically in FIG. 10, female mold section 110 is provided with a ridge 260 which runs along the length of the edge of its top surface, adjacent the concave surface. Ridge 260 acts to compress sheet 15 along the length of fold line 30 when sheet 15 is folded by the movement of folding plate 160. The compression of the sheet along the fold line aids in maintaining the substantially perpendicular fold between first section 20 and second section 25 in the molded shield.

As stated above, in the preferred embodiment described herein, both male and female mold sections are hollow and both are adapted to allow circulation of a coolant therethrough. It is envisioned that the slidable folding plate may also be cooled by means, for example, of a cooling coil. The degree and nature of the cooling of the apparatus, if any, will be dependent on the characteristics of the materials selected for forming the male and female mold and the folding plate. It is believed that devising a suitable cooling system will be within the purview of a person skilled in the art. In the presently preferred embodiment, suitable cooling is achieved by circulation of chilled water through a closed loop system. Preferably, the surfaces of the male and female mold sections and the folding plate are maintained at between 45° and 60° F.

The present invention has been described with reference to presently preferred embodiments. Other variations and embodiments of the present invention may be apparent to a person skilled in the art. Accordingly, the scope of protection sought for the present invention is only limited as set out in the attached claims.

What is claimed is:

1. A molded shield for use as a protector for a roll that is to be secured with chains, comprising:
   (i) a first section for insertion into an end of the roll, the first section having a length and a degree of curvature such that said length is a substantial portion of the circumference of a circle; and
   (ii) a second section integral with the first section and substantially perpendicular thereto, the second section to abut the end of the roll into which the first section is inserted, wherein said molded shield is formed from ultra-high molecular weight high density polyethylene, and wherein said second section has at least one cut line extending through the second section from one edge thereof, wherein said line terminates in an aperture.

* * * * *